(12) United States Patent
Newns et al.

(10) Patent No.: US 6,515,957 B1
(45) Date of Patent: Feb. 4, 2003

(54) FERROELECTRIC DRIVE FOR DATA STORAGE

(75) Inventors: Dennis M. Newns, Yorktown Heights, NY (US); Jonathan Z. Sun, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/413,403

(22) Filed: Oct. 6, 1999

(51) Int. Cl.⁷ .............................. G11B 9/00; G11B 9/02
(52) U.S. Cl. ...................................................... 369/126
(58) Field of Search ..................... ; 369/126; 365/117; G11B 9/02, 9/12, 9/14, 9/00

(56) References Cited

U.S. PATENT DOCUMENTS

| | | | | |
|---|---|---|---|---|
| 4,130,898 A | * | 12/1978 | Urbach et al. | 365/215 |
| 4,139,908 A | * | 2/1979 | Brody | 365/117 |
| 5,323,377 A | * | 6/1994 | Chen et al. | 369/126 |
| 5,481,527 A | * | 1/1996 | Kasanuki et al. | 369/126 |
| 5,946,284 A | * | 8/1999 | Chung et al. | 369/126 |
| 5,953,306 A | * | 9/1999 | Yi | 369/126 |
| 6,046,973 A | * | 4/2000 | Thomas | 369/126 |

FOREIGN PATENT DOCUMENTS

JP      053470335 A   * 12/1993  ......... G11B/009/02

OTHER PUBLICATIONS

Introduction to Solid State Physics: p. 376, Charles Kittel (1986)(info.re: surface density of Ferrolectrics).
Physics of Crystalline Dielectrics; vol. 1; Crystallography and Spontaneous Polarization; I.S. Zheludev, p. 193(info. Re: ferrolectrics not having the angle of a magnetic exchange energy).
Local, Nonvolatile Electronic Writing of Expitaxial Pb(Zr$_{0.52}$Ti$_{0.48}$)O$_3$Heterostructures: CH Ahn; Science 276 p. 1100; (1997).
Control and imaging of ferrolectric domains over large areas with nanometer resoultion in atomically smooth epitaxial Pb(Zr$_{0.2}$Ti$_{0.8}$)O$_3$ thin films: Tybell et al, Appl. Phys. Lett. 72, p. 1454(1998).

* cited by examiner

Primary Examiner—David Hudspeth
Assistant Examiner—Dan I. Davidson
(74) Attorney, Agent, or Firm—Manny W. Schecter, Esq.; McGinn & Gibb, PLLC

(57) ABSTRACT

Ferroelectric thin films can hold non-volatile memories with bit sizes down to 30 nm at room temperature. This invention provides a data storage system that preferably comprises an electrically conducting rotatable hard disk substrate having a ferroelectric storage layer that comprises storage cells which can be written and read along concentric recording tracks, a pivoted servo arm with a free end for movement across the recording tracks. The free end of the servo arm includes both a write head, consisting of an electrically conducting tip, and a read head, consisting of a field effect transistor (FET), held close to the disk surface. The FET has a gate electrode and is positioned on the servo arm with the gate electrode held close to the ferroelectric surface of the disk during read operations of the data storage system. Read and write operations can be performed with standard semiconductor technologies in combination with existing magnetic hard-disk servo-control architecture. Such ferroelectric hard disk data storage systems are expected to increase the areal storage density of hard disks beyond the superparamagnetic limit of around 40 GB/in$^2$.

18 Claims, 1 Drawing Sheet

FERROELECTRIC DRIVE FOR DATA STORAGE

FIELD OF THE INVENTION

The present invention relates to data storage systems. In particular, the present invention relates to data storage systems which utilize ferroelectric materials.

BACKGROUND OF THE INVENTION

Ferroelectrics such as $PbTiO_3$ can sustain surface charge densities up to 50 microcoulombs/$cm^2$ at room temperature, as is noted at page 376 of "Introduction to Solid State Physics" by C. Kittel, 6th Ed., John Wiley & Sons (1986) Like ferromagnets, ferroelectric materials also can form domains with oppositely charged regions. Unlike ferromagnets, however, a ferroelectric domain wall is usually abrupt on an atomic scale, whereas a magnetic domain wall often spreads over 100 nm. This is because ferroelectrics do not have an analog of the magnetic exchange energy (see p. 193, "Physics of Crystalline Dielectrics", I. S. Zheludev, Plenum Press). In the presence of electronic and ionic polarization, the dominant interaction is that of the electrostatic forces between polarized ions. The energies of interaction for parallel and antiparallel arrays of dipoles in dielectrics are very similar and, therefore, a domain wall in a ferroelectric is much thinner than that of a magnetic domain wall. In a strongly anisotropic ferroelectric crystal, the polarization vector does not rotate within a domain wall but simply decreases in absolute value, changes sign, and recovers its original value in the opposite direction. Only in very weakly anisotropic ferroelectric material does the polarization vector actually rotate within a domain wall.

When a ferromagnet is reduced in size, the magnetic anisotropy energy decreases proportionally, while the magnetic moment is exchange-coupled into one single vector with rotational degree of freedom. This results in the so called superparamagnetic limit. For ferromagnets below this limiting volume, the thermal energy in the magnetic moment is large enough to overcome the magnetic anisotropy (which decreases with decreasing volume), and the ferromagnet would lose its average magnetic moment due to thermal fluctuation. This phenomenon is called superparamagnetism. This limiting volume of a ferromagnet is believed to set the ultimate recording density of a magnetic storage medium.

For ferroelectric ordering, the characteristic ordering energy is essentially an intensive quantity. This is believed to arise because there is no exchange coupling to bind neighboring ionic polarization sites in ferroelectric materials [see I. S. Zheludev, supra)]. Accordingly, the energy scale for electrical polarization is directly related to the atomic degrees of freedom of the ionic sites. Therefore, the ferroelectric order does not appear to suffer from the equivalent of a superparamagnetic limit. Thus in principle it may be possible to use ferroelectric domains as recording bits, and thereby attain recording densities far beyond those possible with magnetic mediums.

During the past ten years, intensive materials research in oxide thin films has greatly enriched our knowledge and ability on forming atomically smooth epitaxial oxide, especially perovskite, thin films. We have also seen much progress in single crystal substrate materials which are suitable for such thin films. Today, epitaxial, atomically smooth perovskite oxide thin films can be routinely grown on substrates of 2–3 inch in diameter with a reasonable price for small volume operation (quite possibly for less than $500/wafer for 2-inch size).

At the same time, continued miniaturization of CMOS circuits have made it possible to form FET structures with gate dimensions well below 1 $\mu$m (micrometer), making it possible to fabricate small FET sensing elements with low input capacitances that matches the dimension of individual bit required for high-density read-operation.

These developments, when combined in accordance with the teachings of the present invention, gave us a unique opportunity to explore the possibility of a novel storage concept, namely a ferroelectric-based hard data storage system. In fact, recently a ferroelectric bit size of 30 nm has been experimentally demonstrated in the thin film system of $PZT/SrRuO_3$ (see C. H. Ahn et al, Science 276, 1100 (1997) as well as Tybell et al, Appl. Phys. Lett. 72, 1454 (1998)) (Note that PZT=Pb $(Zr_xTi_{1-x})$ $O_3$, where $0<x<1$).

SUMMARY OF THE INVENTION

The present invention proposes to utilize these special properties of ferroelectric materials. When combined with existing magnetic hard disk's servo-control mechanics and electronics, this approach may provide a ready alternative to magnetic storage, and increase the storage density many times over, while using device and system technologies that exists today.

The present invention broadly provides a data storage system comprising:

a) a storage medium comprising an electrically conducting substrate having a ferroelectric layer thereon, the ferroelectric layer comprising a plurality of cells at its surface, each cell comprising at least one domain, with mutually adjacent domains being capable of storing mutually opposing electrostatic charges, b) a write head comprising an electrically conducting member comprising a projecting portion (or "tip") in closely spaced adjacency to said ferroelectric layer for lateral movement relative thereto, said projecting portion being laterally smaller than a cell, c) a read head comprising a field effect transistor (e.g. MOS FET) with its gate electrode disposed in closely spaced adjacency to said ferroelectric layer for lateral movement relative thereto, said gate electrode being laterally smaller than a cell, and d) a drive, which may comprise an electric motor, adapted to move the storage medium laterally in closely spaced adjacency to the write head and the read head.

Preferably, the substrate is a disk that is rotatable laterally by said drive and the ferroelectric layer comprises a plurality of concentric recording tracks defined by said cells. The storage system preferably includes an elongate arm having a first end and a second end, said elongate arm being pivoted adjacent a first end to permit movement of the second end across a plurality of the concentric recording tracks, the write head and the read head being carried by said elongate arm adjacent the second end thereof According to a preferred embodiment, the elecrically conducting substrate comprising a crystalline substrate and a conducting layer disposed on a surface thereof, while the ferroelectric layer comprises PZT, barium titanate, or lead titanate, and the conducting layer comprises a conducting oxide, such as $La_{0.67}Sr_{0.33}MnO_3$ and $SrRuO_3$.

Moreover, it is preferred that each ferroelectric storage cell has a lateral cell dimension of less than 0.3 $\mu$m

DETAILED DESCRIPTION

Figure 1:
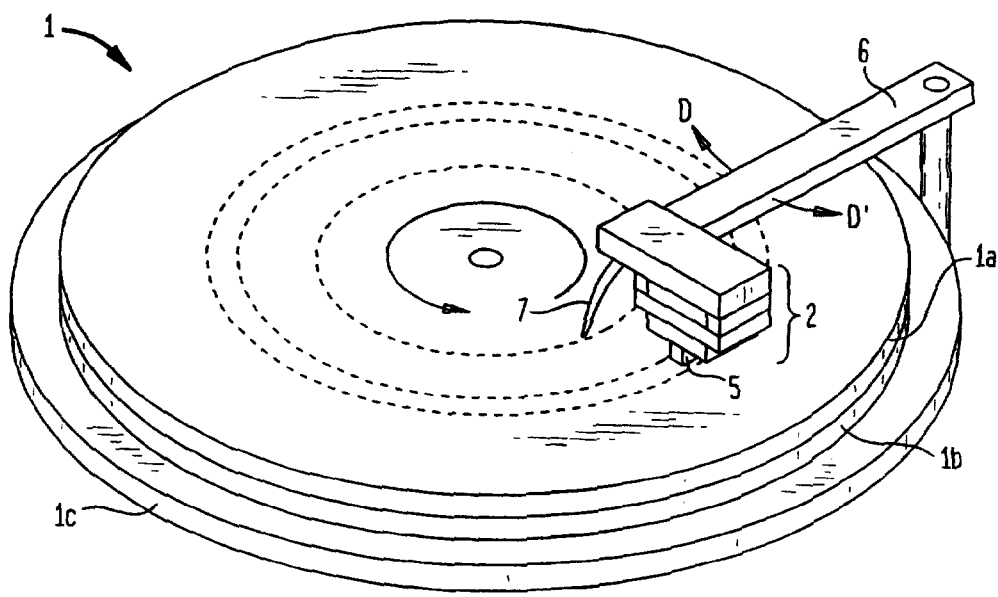
FIG. 1 is a perspective view of a data storage system in accordance with a preferred embodiment of the present invention.
Figure 2:
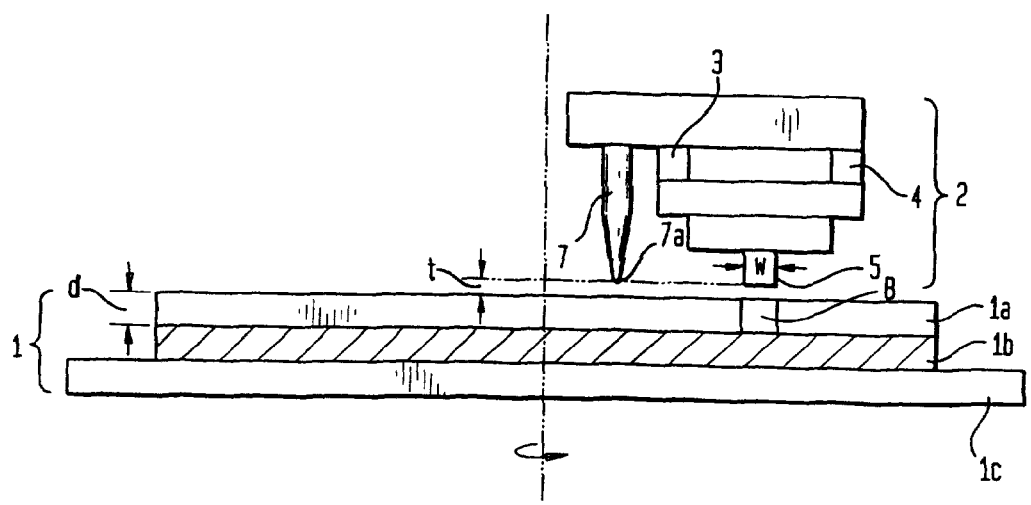
FIG. 2 is a schematic cross-sectional view of the data storage system of FIG. 1.

A schematic view of an embodiment of a ferroelectric hard disk drive for use as a novel data storage system is shown in FIG. 1 and FIG. 2. The embodiment of the novel data storage system which is shown in FIGS. 1 and 2 comprises a storage medium, shown as ferroelectric hard disk 1, and a read-write head 2. The embodiment of FIG. 1 schematically depicts a ferroelectric hard disk design in which a ferroelectric thin film 1a is coated on a disk 1c, which is spinning at high speed, while a special sensing element made of a MOSFET (metal oxide semiconductor field effect transistor) forms the flying read head 2 that reads data from the ferroelectric media 1a.

Media material:—The ferroelectric material 1a is deposited in the form of a thin film of thickness h on an atomically smooth crystalline disk-shaped substrate 1c, of diameter of about 2-inches, for example. The ferroelectric film can be formed of the material PZT, for example, or of other ferroelectric compounds, such as $BaTiO_3$ (barium titanate) or $PbTiO_3$ (lead titanate), depending on the need for system optimization. As shown, the ferroelectric film has been deposited on top of a conducting underlayer 1b which is disposed over substrate 1c. The conducting underlayer 1b forms a return path for the electric field during read-write operation. Preferably, underlayer 1b can be a conducting oxide, such as doped manganite perovskite $La_{0.67}Sr_{0.33}MnO_3$, or $SrRuO_3$, for example.

Both films 1b, 1a may be deposited epitaxially on single crystal substrate wafers 1c to provide optimal performance using known epitaxial growth technology. With some compromise in performance figure of merits such as signal to noise ratio or ultimate storage density, it is possible that a polycrystalline form of film maybe used on cheaper substrates as well.

Read-write head:—A read-write head 2, riding on the same kind of electro-mechanical servo arm as the magnetic read-write heads that are used in known magnetic hard drives, can be used to read and write data from the rotating ferroelectric thin film media.

According to the present invention, and as shown in FIGS. 1 and 2, the read part of the read-write head 2 consists of a MOS FET device with source electrode 3, drain electrode 4, with its gate electrode 5 flying in a lateral direction along a recording track and above and in close proximity to the ferroelectric film 1a of recording media 1. Preferably, the head-media distance may be 100 Å, a number typical of today's magnetic hard-disk systems, and a lateral size w of the gate electrode 5 of 0.3 $\mu$m, which can be achieved with today's lithographic processes. This corresponds to a gate capacitance of $C_F = 0.0885 \times 10^{-12} \epsilon(W^2/d) \approx 10^{-15}$ F. If one assumes conservatively a charge coupling efficiency of $\eta = 10\%$, and a gate voltage sensitivity of Vs=100 mV, one would be able to sense a ferroelectric bit B containing a total amount of surface charge $Q_c = V_s C_F/\eta \approx 10^{-15}$ C. For a surface polarization of 20 $\mu$C/cm², this translates to a bit-area of $A_B = 5.0 \times 10^{-11}$ cm², which corresponds to a storage density of 130 GB/in².

The practical limiting factor at present appears to be the difficulty of defining the front sensing pillar (gate electrode 5) corresponding to the bit size—in this case approximately 700 Angstroms if the bit density is pushed toward 130 GB/in², as well as the difficulty of maintaining tracking stability (current magnetic disks have track widths about 2 micrometers (2 $\mu$m), and has a lateral stability of around 0.2 $\mu$m. With a little more work the track-width may be shrunk down to well below 1 $\mu$m.

The present ferroelectric data storage system design thus has the potential for essentially eliminating the media and readout as the limiting factors for storage density. With these potentials, the practical storage density is only limited by the mechanical stability of the read-write arm with respect to the media film 1.

Write-operation:—The write operation involves applying an electric field to the media through a small "tip" or projecting portion 7a of an electrically conducting member 7 flying above the media film. As shown in FIG. 1, such conducting member 7 may be simply carried by the same elongate arm 6 that carries FET read head 2. If one assumes a ferroelectric media film 1a thickness of d=300 Å(Angstroms), a tip flying t=100 Å above the media, and a media coercive field of $E_c = 3 \times 10^5$ V/cm, one would have to exert a write voltage of $V_c = E_c (d+t) \approx 1.2$ V. In practice more excitation voltages might be needed. In the work of C. B. Ahn et al. (Science 276, 1100 (1997)), a write voltage of 4 V was shown to be effective for bit reversal. At such a voltage level vacuum field-emission may result, and the actual process of ferroelectric domain reversal may thus involve effective charge spraying between the write tip and the surface of ferroelectric media 1. The latter reference indicates that this is an acceptable mode of operation.

Avoiding surface charge accumulation:—As will be understood by those skilled in the art, the ferroelectric polarization may attract free charges from the environment, which over a period of a few hours may result in accumulation of charges at the surface of the ferroelectric bits, thus nullifying the surface electric field. Without surface electric field the readout methodology discussed above may encounter difficulties.

To avoid this problem, there are a number of ways to remove the mobile surface charge and restore the surface electric field associated with the ferroelectric polarization. One way is to expose the surface of ferroelectric disk 1 to visible or UV light illumination. Because electrons binding to the positive poles of the ferroelectric domain will have a different effective work function than those binding to the negative poles, a different external photo-emission current will result, which leads to a rebalancing of charge on the surface that can be detected by the FET read head 2 as discussed previously. Simple mechanical brushing of the disk surface may also have the same effect in removing excess surface charge, although such processes may have materials-related complications such as wear lifetime due to abrasion.

In summary, the present invention represents a new development in ferroelectric thin film technology which affords a new opportunity in high density storage. By combining the state of the art ferroelectric thin film materials know-how, the existing MOSFET technology, and the current electro-mechanical servo system of magnetic hard disks, it is possible to create a new type of mass storage device, namely ferroelectric hard disks, which can bring many times higher areal storage densities than currently achievable with magnetic storage media. Such ferroelectric media does not suffer from the superparamagnetism density limit, and can thus be scaled down much further as our lithography and electro-mechanical servo system technology continues to improve.

Ferroelectric thin films can hold non-volatile memories with bit sizes down to 30 nm at room temperature. This invention provides a data storage system that preferably comprises an electrically conducting rotatable hard disk substrate having a ferroelectric storage layer that comprises storage cells which can be written and read laterally along concentric recording tracks, a pivoted servo arm with a free end for movement (in directions D, D' in FIG. 1)across the recording tracks. The free end of the servo arm includes both a write head, consisting of an electrically conducting tip, and a read head, consisting of a field effect transistor (FET), held close to the disk surface. The FET has a gate electrode and is positioned on the servo arm with the gate electrode held close to the ferroelectric surface of the disk during read operations of the data storage system. Read and write operations can be performed with standard semiconductor technologies in combination with existing magnetic hard-disk servo-control architecture. Such ferroelectric hard disk data storage systems are expected to increase the areal storage density of hard disks beyond the superparamagnetic limit of around 40 GB/in$^2$ The present invention has been described with reference to preferred embodiments in order to facilitate a better understanding of the invention, those skilled in the art will recognize that the invention can be embodied in various ways without departing from the scope and spirit of the invention as set forth in the appended claims.

What is claimed is:

1. A data storage system comprising:
    a storage medium comprising an electrically conducting substrate having a ferroelectric layer thereon, said ferroelectric layer comprising a plurality of cells at a surface thereof, each cell comprising at least one domain, mutually adjacent domains being capable of storing mutually opposing electrostatic charges;
    a write head comprising an electrically conducting member having a projecting portion in closely spaced adjacency to said ferroelectric layer, said projecting portion being laterally smaller than a cell;
    a read head comprising a field effect transistor with a gate electrode thereof disposed in closely spaced adjacency to said ferroelectric layer, said gate electrode being laterally smaller than a cell; and
    a drive adapted to move said storage medium rotatably in closely spaced adjacency to said write head and said read head.

2. A data storage system as set forth in claim 1, wherein said substrate comprises a disk rotatable by said drive, said ferroelectric layer comprising a plurality of concentric recording tracks defined by said cells.

3. A data storage system as set forth in claim 2, further comprising an elongate arm having a first end and a second end, said elongate arm being pivoted adjacent said first end to permit movement of said second end across a plurality of said concentric recording tracks, said write head and said read head being carried by said elongate arm adjacent said second end thereof.

4. A data storage system as set forth in claim 1, said elecrically conducting substrate comprising a crystalline substrate and a conducting layer disposed on a surface thereof.

5. A data storage system as set forth in claim 4, said ferroelectric layer comprising a member selected from the group consisting of PZT, barium titanate, and lead titanate, said conducting layer comprising a conducting oxide.

6. A data storage system as set forth in claim 5, said conducting oxide comprising a member selected from the group of conducting oxides consisting of $La_{0.67}Sr_{0.33}MnO_3$ and $SrRuO_3$.

7. A data storage system as set forth in claim 6, each said cell having a lateral cell dimension of less than 0.3 $\mu$m.

8. A data storage system comprising:
    a storage medium including a substrate with a ferroelectric layer;
    a read head including a field effect transistor with a gate electrode disposed adjacent to said ferroelectric layer; and
    a drive adapted to rotate said storage medium,
    wherein a lateral size of said gate electrode is less than a lateral size of a cell being read.

9. The data storage system as claimed in claim 8, wherein said ferroelectric layer includes a plurality of cells at a surface thereof.

10. The data storage system as claimed in claim 9, wherein each cell includes at least one domain.

11. The data storage system as claimed in claim 10, wherein mutually adjacent domains store mutually opposing electrostatic charges.

12. The data storage system as claimed in claim 8, further comprising:
    a write head including an electrically conducting member having a projecting portion adjacent to said ferroelectric layer.

13. The data storage system as claimed in claim 12, wherein a lateral size of said projecting portion is smaller than a lateral size of a cell being written to.

14. The data storage system as claimed in claim 8, wherein a lateral size of said gate electrode less than 1 $\mu$m.

15. A data storage system comprising:
    means for storing data in at least one of a plurality of cells;
    means for reading data in said storing means, said reading means including a field effect transistor with a gate electrode disposed adjacent to a ferroelectric layer; and
    means for rotating said storing means,
    wherein a lateral size of said gate electrode is less than a lateral size of a cell being read.

16. The data storage system as claimed in claim 15, wherein said storing means includes a substrate with said ferroelectric layer having a plurality of cells at a surface thereof.

17. The data storage system as claimed in claim 15, further comprising:
    means for writing data to said storing means, said writing means including an electrically conducting member having a projecting portion adjacent to said ferroelectric layer.

18. The data storage system as claimed in claim 17, wherein a lateral size of said projecting portion is smaller than a lateral size of a cell being written to.

* * * * *